(12) United States Patent
Choi

(10) Patent No.: US 7,705,925 B2
(45) Date of Patent: *Apr. 27, 2010

(54) METHOD OF MANUFACTURING AN ARRAY SUBSTRATE FOR USE IN A LCD DEVICE

(75) Inventor: Woo-Hyuk Choi, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/774,517

(22) Filed: Feb. 10, 2004

(65) Prior Publication Data

US 2004/0155992 A1    Aug. 12, 2004

Related U.S. Application Data

(62) Division of application No. 09/745,527, filed on Dec. 26, 2000, now Pat. No. 6,717,631.

(30) Foreign Application Priority Data

Dec. 27, 1999    (KR)    .............................. 1999-62983

(51) Int. Cl.
*G02F 1/136* (2006.01)

(52) U.S. Cl. .............................. 349/43; 349/41; 438/750

(58) Field of Classification Search ................ 349/139, 349/187, 41–43; 438/149, 750–7
See application file for complete search history.

(56) References Cited

U.S. PATENT DOCUMENTS 5,166,085 A * 11/1992 Wakai et al. ................ 438/158
5,920,082 A * 7/1999 Kitazawa et al. ............... 257/59
5,953,085 A   9/1999 Shimada
6,104,042 A * 8/2000 Sah .............................. 257/59
6,288,414 B1 * 9/2001 Ahn ............................ 257/72
6,383,926 B2 * 5/2002 Powell ....................... 438/678
6,500,702 B2 * 12/2002 Lee et al. .................... 438/155
6,511,869 B2 * 1/2003 Colgan et al. ............... 438/149
6,627,470 B2 * 9/2003 Yoo et al. ...................... 438/30
6,717,631 B2 * 4/2004 Choi ........................... 349/43
7,145,539 B2 * 12/2006 Lim ............................. 345/98

* cited by examiner

*Primary Examiner*—Dung T. Nguyen
(74) *Attorney, Agent, or Firm*—McKenna Long & Aldridge LLP

(57) ABSTRACT

A TFT array substrate has a substrate with a pixel region and a switching region. A gate line has both a gate electrode that extends into the switching region and a gate pad is formed on the substrate. A gate pad electrode is formed on the gate pad. A data line includes both a source electrode that extends from the data line into the switching region and a data pad. A data pad electrode is formed on the data pad. A drain electrode that is spaced apart from the source electrode is over the gate electrode. A gate insulation layer covers the gate electrode and the substrate. Semiconductor layers, including a pure amorphous silicon layer and a doped amorphous silicon layer, and a protection layer extends over the source electrode, over the silicon layers, and over part of the drain electrode. A pixel electrode is formed on the pixel region. The pixel electrode contacts a side portion of the drain electrode. The TFT array substrate is fabricated using a back exposure.

10 Claims, 8 Drawing Sheets

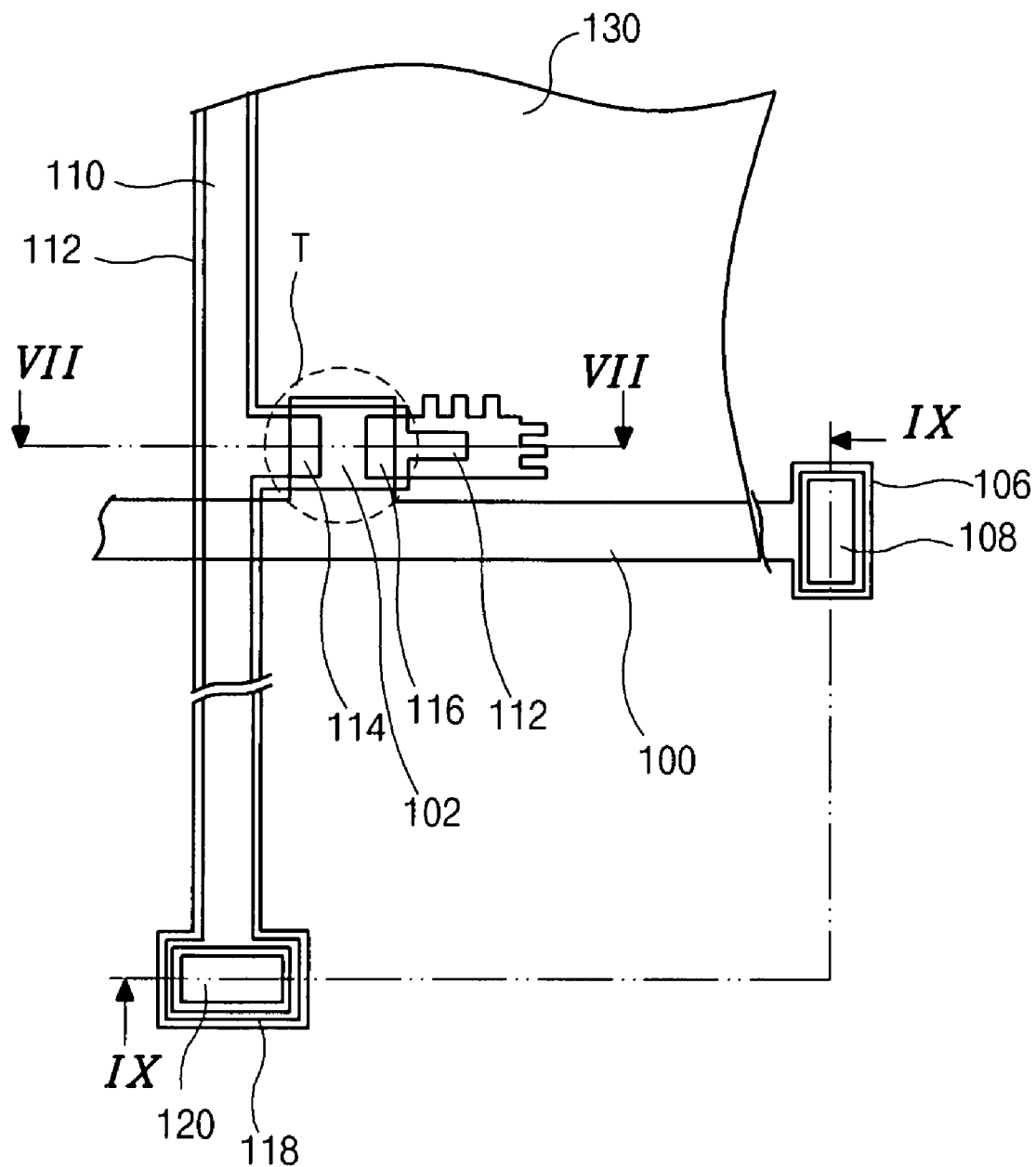

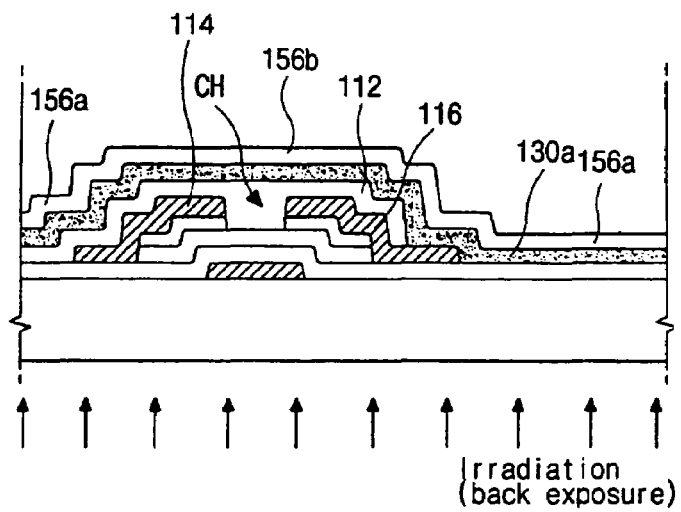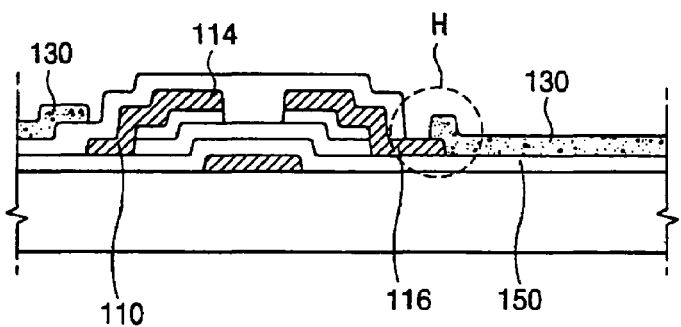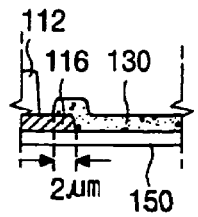

METHOD OF MANUFACTURING AN ARRAY SUBSTRATE FOR USE IN A LCD DEVICE

CROSS-REFERENCE TO RELATED APPLICATIONS

This application is a divisional application of U.S. patent application Ser. No. 09/745,527 filed Dec. 26, 2000, now U.S. Pat. No. 6,717,631; which claims priority to Korean Patent Application No. 1999-62983, filed Dec. 27, 1999, which is incorporated by reference for all purposes as if fully set forth herein.

This application claims the benefit of Korean Patent Application No. 1999-62983, filed on Dec. 27, 1999, which is hereby incorporated by reference.

BACKGROUND OF THE INVENTION

1. Field of the Invention

The present invention relates to a liquid crystal display (LCD) device, and more particularly, to a LCD device having thin film transistors (TFTs) and to a method of manufacturing the same.

2. Description of Related Art

In general, a liquid crystal display (LCD) device displays an image using a plurality of pixels. An LCD device that uses thin film transistors (TFTs) as switching elements is typically called a thin film transistor liquid crystal display (TFT-LCD) device.

A liquid crystal display device uses the optical anisotropy and polarization properties of liquid crystal molecules. Because of their peculiar characteristics liquid crystal molecules have a definite orientational order in arrangement. The arrangement direction of liquid crystal molecules can be controlled by an applied electric field. In other words, when electric fields are applied to liquid crystal molecules, the arrangement of the liquid crystal molecules changes. Since incident light is refracted according to the arrangement of the liquid crystal molecules, due to the optical anisotropy of liquid crystal molecules, image data can be displayed.

An active matrix LCD (AM-LCD) has its thin film transistors (TFTs) and pixel electrodes arranged in a matrix. Such LCDs can have high resolution and superior imaging of moving images.

FIG. 1 is a cross-sectional view illustrating a conventional liquid crystal display (LCD) panel. As shown in FIG. 1, the LCD panel 20 has lower and upper substrates 2 and 4 with a liquid crystal layer 10 interposed therebetween. The lower substrate 2, which is referred to as an array substrate, has a TFT. "S" as a switching element that changes the orientation of the liquid crystal molecules. A pixel electrode 14 applies a voltage to the liquid crystal layer 10 according to the state of the TFT "S". The upper substrate 4 has a color filter 8 for implementing a color and a common electrode 12 on the color filter 8. The common electrode 12 serves as an electrode for applying a voltage to the liquid crystal layer 10. The pixel electrode 14 is arranged over a pixel portion "P", of a display area. Further, to prevent leakage of the liquid crystal layer 10, the two substrates 2 and 4 are sealed using a sealant 6.

FIG. 2 is a plan view illustrating an array substrate. A gate line 22 is arranged in a transverse direction and a data line 24 is arranged in perpendicular to the gate line 22. A pixel region having a pixel electrode 14 is defined by the gate line 22 and the data line 24.

In an AM-LCD, the switching element (TFT "S") that selectively applies the voltage to the liquid crystal layer 10 (see FIG. 1) is formed near the crossing of the gate line 22 and the data line 24. The TFT "S" has a gate electrode 26 that is extended from the gate line 22, a source electrode 28 that is extended from the data line 24, and a drain electrode 30 that is electrically connected to the pixel electrode 14 via a contact hole 31.

A gate pad 21 is formed at one end of the gate line 22, and a data pad 23 is formed at one end of the data line 24. The gate and data pads 21 and 23 are electrically connected with external drive circuitry (not shown) that operates the TFT "S" and thus the pixel electrode 14. The gate line 22 and the pixel electrode 14 form a storage capacitor "$C_{st}$" which stores electric charges.

When the gate line 22 receives gate signals, the TFT "S" turns ON. The information on the data line 24 is then applied to the pixel electrode 14. The applied electric field from the pixel electrode 14 then changes the arrangement direction of the liquid crystal molecules, causing the liquid crystal molecules to refract the light generated by a back light device. When the gate line 22 turns the TFT "S" to the OFF-state, data signals are not transmitted to the pixel electrode 14. In this case, the arrangement of the liquid crystal is not changed, and thus the direction of the light from back light device is not changed.

When fabricating a liquid crystal panel, a number of complicated process steps are required. In particular, the TFT array substrate requires numerous mask processes. Each mask process requires a photolithography process. Thus, to reduce cost and manufacturing time, the number of mask processes should be minimized.

In general, a manufacturing process depends on the materials used and on the design goals. For example, the resistivity of the material used for the gate lines and the data lines impacts the picture quality of large LCD panels (over 12 inches) and of LCD panels having high resolution. With such LCD panels, a material such as Aluminum (Al) or Al-alloy is often used for the gate lines and the data lines.

In LCD devices having a high aperture ratio, a method of back exposure is employed when forming the pixel electrode 14. That method will now be explained.

FIGS. 3A to 3E are cross-sectional views taken along line III-III and illustrate the process steps of fabricating a conventional TFT array substrate for an active matrix LCD device.

An inverted staggered type TFT is generally used due to its simple structure and superior efficiency. The inverted staggered type TFT can be classified as either a back channel etched type (EB) and an etch stopper type (ES), depending on the fabrication method that is used. The fabrication method of the back channel etched type TFT will now be explained.

A first metal layer is deposited on a substrate 1 by a sputtering process. The substrate previously underwent a cleaning process to enhance adhesion between the substrate 1 and the first metal layer. That cleaning process removes organic materials and alien substances from the substrate.

FIG. 3A shows a step of forming a gate electrode 26 by patterning the first metal layer. The gate electrode 26 is usually Aluminum, which reduces the RC delay owing to a low resistance. However, pure Aluminum may result in line defects caused by formation of hillocks during a subsequent high temperature process. Thus, an Aluminum alloy or another material is beneficially used.

Referring to FIG. 3B, a gate insulation layer 50 is formed over the surface of the substrate 1 and over the gate electrode 26. Then, a pure amorphous silicon (a-Si:H) layer and a doped amorphous silicon ($n^+$ a-Si:H) layer are formed in sequence on the gate insulation layer 50, and then patterned to form an active layer 52 and an ohmic contact layer 54. The ohmic contact layer 54 reduces the contact resistance between the active layer 52 and electrodes that will be formed later.

As depicted in FIG. 3C, source and drain electrodes 28 and 30 are formed by depositing and patterning a second metal layer. A portion 51 of the ohmic contact layer 54 on the active layer 52 is etched using the source and drain electrodes 28 and 30 as masks. If the ohmic contact layer 54 between the source and drain electrodes 28 and 30 is not removed, serious problems of deteriorated electrical characteristics and low efficiencies of the TFT "S" (see FIG. 2) can result. Etching the portion of the ohmic contact layer 54 over the gate electrode 26 requires special attention. While etching the ohmic contact layer 54, the active layer 52 is typically over-etched by about 50~100 Å due to the fact that the active layer 52 and the ohmic contact layer 54 have no etch selectivity.

As shown in FIG. 3D, an insulating protection layer 56 is formed over the substrate 1 and over the source and drain electrodes 28 and 30. The protection layer protects the active layer 52. The protection layer is etched to form a drain contact hole 31 that is used to connect the drain electrode 30 to a pixel electrode 14 that is formed later.

Due to the unstable energy state of the active layer 52, and to residual substances that are generated during etching that can affect the electrical characteristics of the TFT, the protection layer 56 is usually made of an inorganic material, such as $SiN_x$ and $SiO_2$, or an organic material such as a BCB (benzocyclobutene). In addition, the protection layer 56 should have a high light transmittance, a high humidity resistance, and a high durability in order to protect the channel area and major portions of a pixel region from humidity damage and scratches that can occur during later process steps.

FIG. 3D also shows a step of forming a pixel electrode 14 by depositing a Transparent Conducting Oxide (TCO) layer and by forming a photoresist "PR". Indium Tin Oxide (ITO) or Indium Zinc Oxide (IZO) is usually used for the Transparent Conducting Oxide (TCO) layer. The photoresist "PR" is a material which, when being subject to light irradiation through a mask, absorbs light energy to cause a photochemical reaction and to form a latent image. To obtain a high aperture ratio, a negative photoresist is preferably used. The portion of the photoresist that does not absorb light is removed during a developing process.

When using a negative photoresist, a back exposure is used in the patterning process. Namely, in the conventional method of fabricating an LCD device, the pixel electrode is formed using a negative photoresist in order to enhance the aperture ratio. With the negative photoresist in place, a back exposure and a front exposure are performed simultaneously to form the pixel electrode. As shown in FIG. 3D, areas "B" of the photoresist "PR" are exposed by the back exposure and area "F" of the photoresist "PR" is exposed by the front exposure. In the front exposure process, a mask 58 is required for the area "F" (which is not exposed by the back exposure) to make the pixel electrode 14 have a contact with the drain electrode 30.

Referring to FIG. 3E, a high aperture ratio is produced by the back exposure due to the fact that the area of the pixel electrode 14 is enlarged.

FIG. 4 is a cross-sectional view taken line IV-IV of FIG. 2 and illustrates gate and data pads. A gate pad 21 is initially formed on the substrate 1. Then, the gate insulation layer 50 is deposited and etched to produce a gate pad contact hole that exposes a portion of the gate pad 21. A data pad 23 is then formed on the gate insulation layer 50. Then, the protection layer 56, which is patterned to have gate and data pad contact holes that expose the gate and data pads, is formed. Gate and data pad electrodes 62 and 60, which electrically connect to the gate and data pads 21 and 23, via the corresponding contact holes, are then formed on the protection layer 56.

FIG. 5 is a flow chart illustrating the manufacturing process steps of the LCD device as shown in FIGS. 3A to 3E.

In the first step, ST200, a glass substrate is cleaned by a cleaning process. That cleaning process enhances adhesion between the substrate and the first metal layer by removing organic materials, alien substances, and particles from the substrate.

In the second step, ST210, the first metal layer, which may be of Aluminum or Molybdenum, is deposited. Then, the gate electrode and a first capacitor electrode, which are portions of the gate line, are formed by lithography.

In the third step, ST220, the gate insulation layer and the semiconductor layers (the active layer and the ohmic contact layer) are sequentially formed. The gate insulation layer is beneficially comprised of Silicon Oxide or of Silicon Nitride and has a thickness of about 3000 Å.

In the fourth step, ST230, the source and drain electrodes are formed by depositing and patterning a metallic material such as Chrome (Cr) or Cr-alloy.

In the fifth step, ST240, a channel region is formed by removing a portion of the doped amorphous silicon layer (ohmic contact layer) between the source and drain electrodes. In this step, the source and drain electrodes are used as masks.

In the sixth step, ST 250, the protection layer is formed to protect the other elements. The protection layer includes contact holes and is made of a material having a high light transmittance, a high humidity resistance, and a high durability.

In the seventh step, ST260, a transparent conductive electrode, beneficially comprised of ITO (Indium-Tin-Oxide) is-formed. Then, the pixel electrode is formed by using back and front exposures as previously described. The gate and data pad electrodes are also formed in this step.

As described above, the prior art requires various masks when fabricating the TFT array substrate of an LCD device, and each mask process requires several steps such as a cleaning step, a depositing step, a baking step and an etching step. Therefore, if the number of mask processes is decreased by only one mask, the throughput and manufacturing yields can dramatically increase and the manufacturing costs and time can be reduced. Furthermore, in the conventional art process of forming pixel electrodes, although a back exposure is used an additional mask for the front exposure is necessary.

SUMMARY OF THE INVENTION

An object of the present invention is to provide a method of decreasing the number of masks required when forming a pixel electrode in a thin film transistor (TFT) array substrate used in a liquid crystal display (LCD) device. Beneficially, such a method increases the throughput and manufacturing yields.

To achieve these and other advantages and in accordance with the purposes of the present invention, as embodied and broadly described, there is provided a TFT array substrate for use in an LCD device that includes a substrate having a pixel region and a switching region. A gate line is arranged in a transverse direction and a gate electrode extends from the gate line to the switching region. A gate pad is formed on the gate line. A gate pad electrode is formed at the gate pad. A data line is arranged in a direction perpendicular to the gate line. A source electrode extends from the data line to the switching region. A data pad is formed on the data line. A data pad electrode is formed at the data pad. A drain electrode is spaced apart from the source electrode and over the gate electrode. The drain electrode has a first side that faces the source electrode and a second side that is beneficially opposite the first side. A gate insulation layer covers the gate electrode and the substrate. Semiconductor layers, including a pure amorphous silicon layer and a doped amorphous silicon layer, are positioned between the gate insulation layer and the source and drain electrodes. A protection layer that protects the source and drain electrodes and the pure amorphous silicon layer, but that exposes the second side of the drain electrode, is formed. A pixel electrode is formed on the protection layer in the pixel region. That pixel electrode contacts the second side of the drain electrode. Beneficially, the pixel electrode overlaps the second side of the drain electrode.

To achieve the above objects, in another aspect, the present invention provides a method of fabricating a TFT array substrate for use in an LCD device. That method includes providing a substrate, forming a gate line having a gate electrode and a gate pad on the substrate by depositing and patterning a first metallic material. Then, forming a gate insulation layer on the substrate that covers the gate line, the gate electrode, and the gate pad. Then, forming semiconductor layers, including a pure amorphous silicon layer and a doped amorphous silicon layer, on the gate insulation layer. Then, forming a source electrode and a drain electrode that has a first side that faces the source electrode, and a second side that is beneficially opposite the first side. A data line and a data pad are formed by depositing and patterning a second metallic material. Then, forming a protection layer over the source and drain electrodes, the data line, the semiconductor layers, and the data pad. The protection layer is patterned to expose the second side of the drain electrode. The second side is exposed by forming a negative photoresist on the protection layer, patterning the photoresist using a back exposure, and using a photolithography process to expose the second side of the drain electrode. A pixel electrode is then formed in electrical contact with the second side of the drain electrode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a plan view illustrating a pixel of an array substrate according to an embodiment of the present invention;

FIGS. 7A to 7E are cross-sectional views taken line VII-VII of FIG. 6 and illustrate process steps of fabricating a TFT array substrate;

FIG. 8 is an enlarged view of a portion "H" of FIG. 7E;

DETAILED DESCRIPTION OF THE ILLUSTRATED EMBODIMENTS

Figure 1:
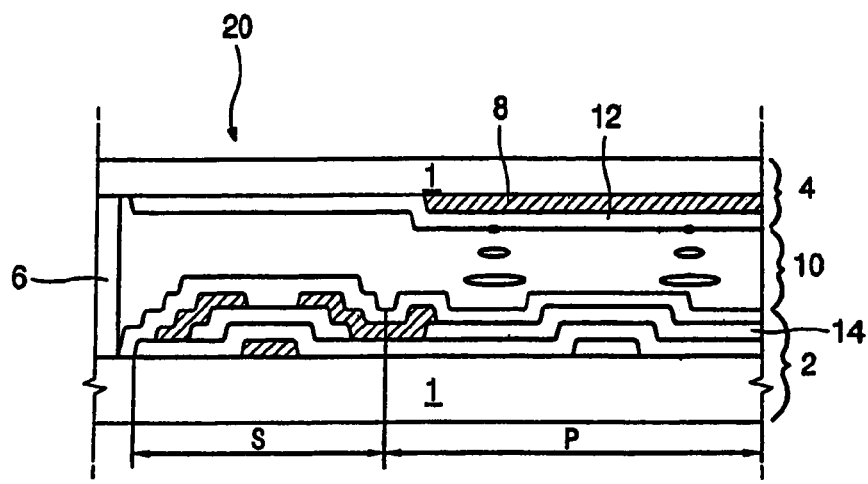
FIG. 1 is a cross-sectional view illustrating a general liquid crystal display (LCD) panel.
Figure 2:
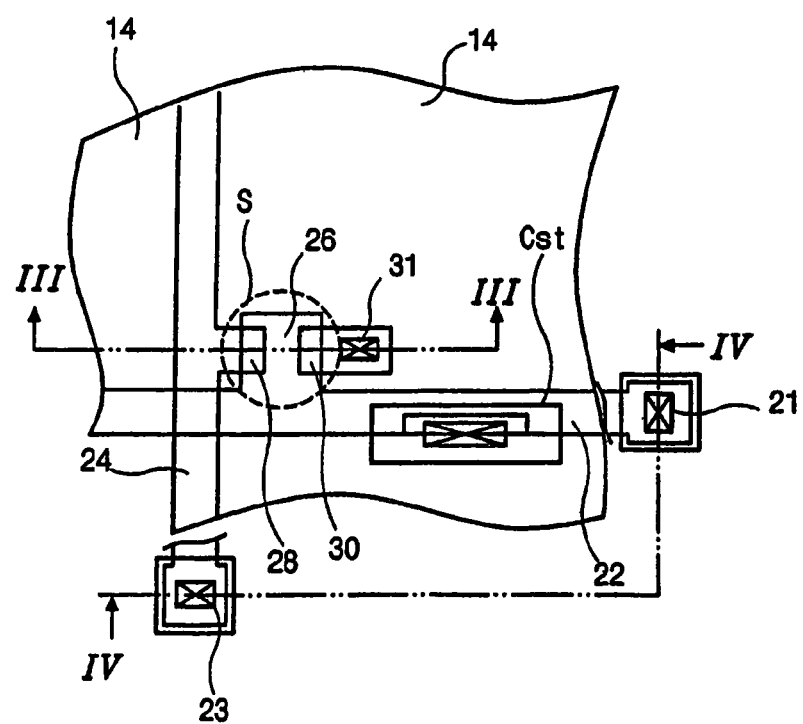
FIG. 2 is a plan view illustrating a pixel of a conventional LCD panel fabricated by using a back exposure and a front exposure.
Figure 3A:
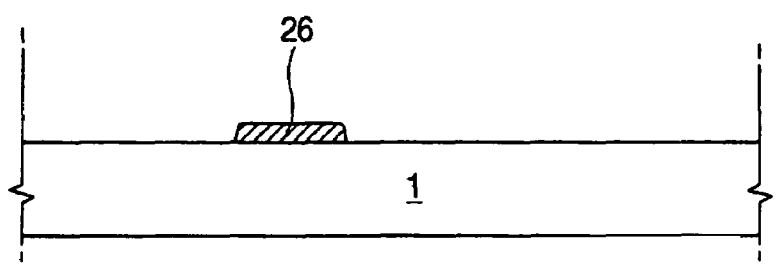
FIGS. 3A to 3E are cross-sectional views taken line III-III of FIG. 2 and illustrate process steps of fabricating a conventional TFT array substrate.
Figure 3B:
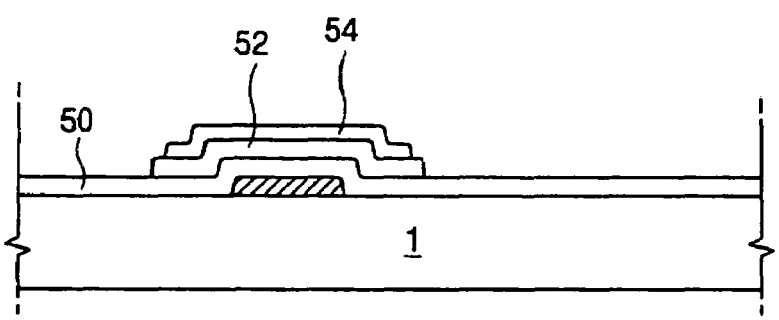
Figure 3C:
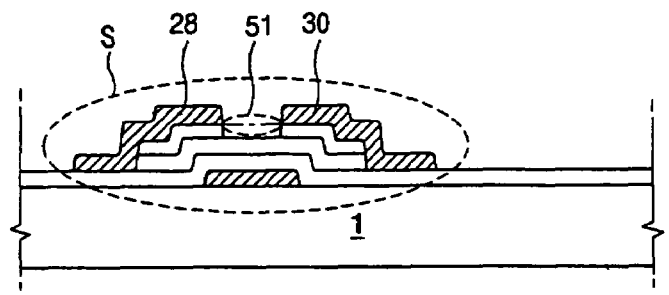
Figure 3D:
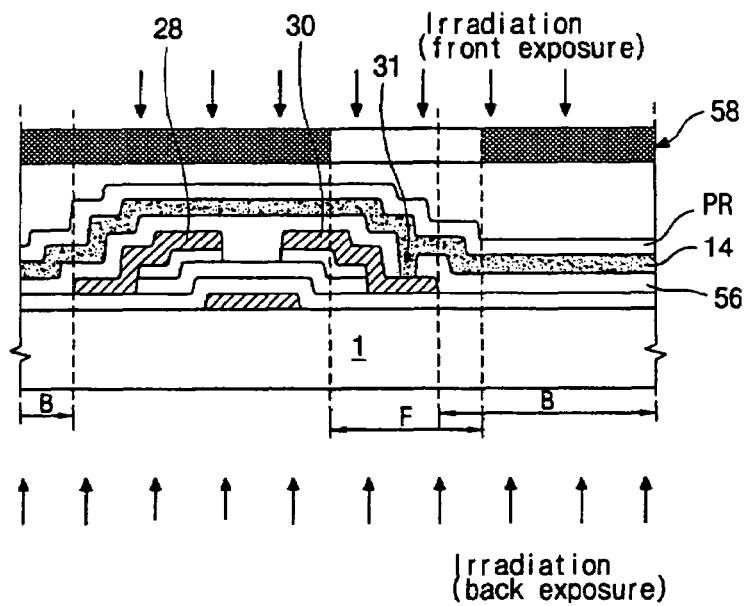
Figure 3E:
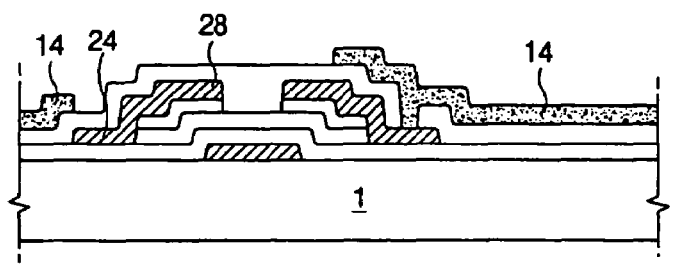
Figure 4:
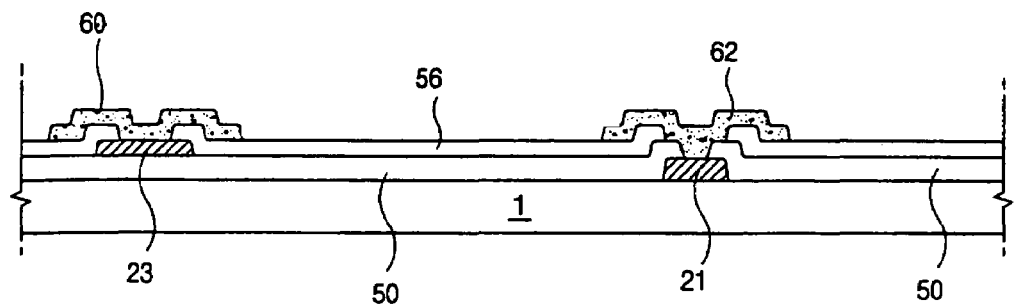
FIG. 4 is a cross-sectional view taken line IV-IV of FIG. 2 and illustrates a gate pad and a data pad according to the conventional art.
Figure 5:
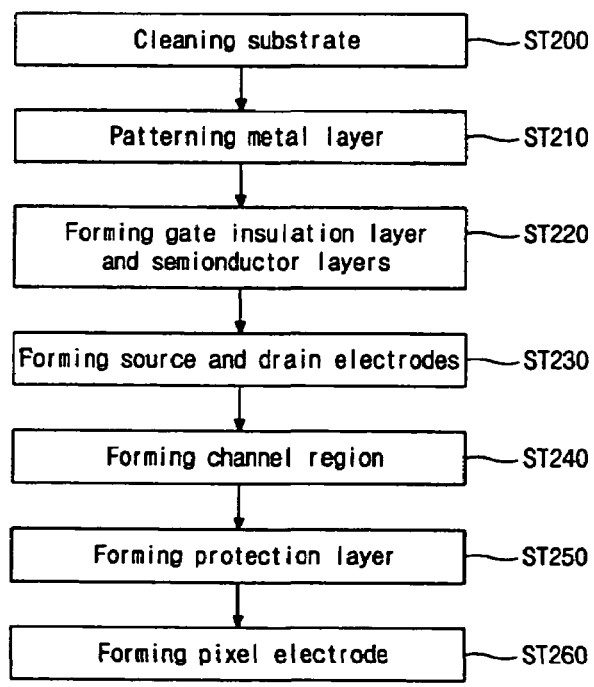
FIG. 5 is a flow chart illustrating a manufacturing process of a liquid crystal display device according to the conventional art.

Reference will now be made in detail to an illustrated embodiment of the present invention, an example of which is shown in the accompanying drawings.

FIG. 6 is a plan view illustrating a pixel of a thin film transistor (TFT) array substrate for use in a liquid crystal display (LCD) panel according to the principles of the present invention. A gate line 100 is arranged in a transverse direction and a data line 110 is arranged in a direction perpendicular to the gate line 110. A gate pad 106 is located at one end of the gate line 100 and a gate pad electrode 108 is formed on the gate pad 106. A data pad 118 is positioned at one end of the data line 110 and a data pad electrode 120 is formed on the data pad 118.

A gate electrode 102 that extends from the gate line 100 is positioned near the crossing of the gate and data lines 100 and 110. A source electrode 114 extends from the data line 110 near that crossing and over the gate electrode 102. A drain electrode 116 is formed spaced apart from the source electrode 114 and over the gate electrode 102. Thus, a TFT "T" is positioned at a predetermined location.

Further, a protection layer 112 is positioned so as to protect the TFT "T" and the data line 110. A pixel electrode 130 having an electrical contact with the drain electrode 116 is then formed. Significantly, the pixel electrode 130 is connected with to a side portion of the drain electrode 116. Thus, a drain contact hole is not needed through the protection layer 112 as in the prior art. The side portion of the drain electrode 116 beneficially has a bent-shaped periphery. This enables an increase in the contact area between the drain electrode 116 and the pixel electrode 130.

FIGS. 7A to 7E are cross-sectional views taken line VII-VII of FIG. 6 and help illustrate the steps of fabricating a TFT array substrate. The pixel electrode 130 (see FIG. 6) is formed using only the back exposure. In the embodiment of the present invention, the pixel electrode is in contact with the side portion of the drain electrode, i.e., a side contact is used.

Figure 7A:
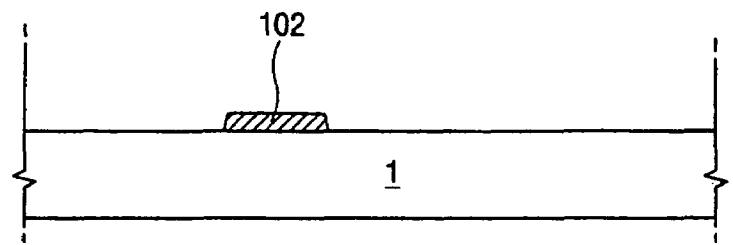

FIG. 7A shows a step for forming the gate electrode 102 on a substrate 1 by patterning a first metal layer. As a metal for the gate electrode 102, Aluminum, Chrome or Molybdenum is beneficially used.

Figure 7B:
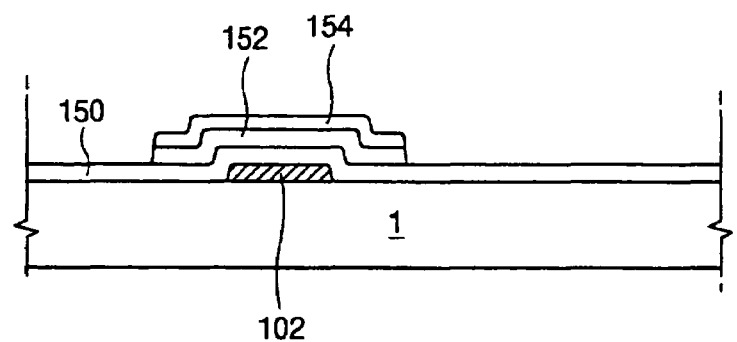

Referring to FIG. 7B, the gate insulation layer 150 is formed over the surface of the substrate 1, including over the gate electrodes 102. Then, a pure amorphous silicon (a-Si:H) layer and a doped amorphous silicon (n+ a-Si:H) layer are sequentially formed on the gate insulation layer 150 and then patterned to form an active layer 152 and an ohmic contact layer 154.

Figure 7C:
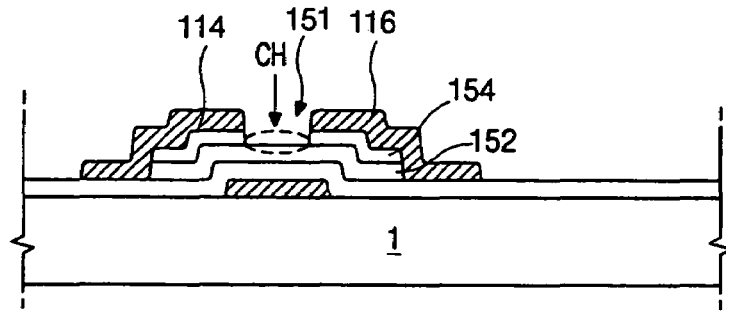

As depicted in FIG. 7C, the source and drain electrodes 114 and 116 are then formed by depositing and patterning a second metal layer. A portion 151 of the ohmic contact layer 154 on the active layer 152 is etched to form a channel region "CH" using the source and drain electrodes 114 and 116 as masks.

As shown in FIG. 7D, a protection layer 112 is formed to protect the active layer 152. This is performed by depositing an insulation material over the substrate structure. That insulation material is then etched to expose a side portion of the drain electrode 116. That side portion will be used to connect the drain electrode 116 to the pixel electrode 130, which is formed in a later step. The side portion or end portion of the drain electrode 116 that is exposed is beneficially located opposite the source electrode 114.

Due to the unstable energy state of the active layer 152, and to the residual substances produced during etching that can affect the electrical characteristics of the TFT, the protection layer 112 is beneficially made of inorganic materials such as $SiN_x$ and $SiO_2$, or of organic materials such as a BCB (benzocyclobutene). The protection layer 112 should have a high light transmittance, a high humidity resistance, and a high durability in order to protect the channel area of the TFT and portions of a pixel region from possible humidity damage and scratches that could occur during later process steps.

FIG. 7D also shows a step of sequentially depositing a Transparent Conducting Oxide (TCO) 130a and a photoresist 156. Indium Tin Oxide (ITO) or Indium Zinc Oxide (IZO) is usually employed for the Transparent Conducting Oxide (TCO) layer 130a. The photoresist 156 is a material which, when subjected to light irradiation through a mask, absorbs light energy and undergoes a photochemical reaction to form a latent image. To get a high aperture ratio, a negative photoresist is used according to this embodiment of the invention. The portion of the photoresist which does not absorb light is removed during a developing process. A back exposure is used in the patterning process to enhance the aperture ratio. The back exposure is performed to form the pixel electrode 130. As shown in FIG. 7D, a portion 156a of the photoresist 156 is exposed by the back exposure and a portion 156b of the photoresist 156 is not exposed by the back exposure. Thus, the portion of the TCO layer 130a which is under the exposed portion 156a of the photoresist 156 is defined as the pixel electrode 130 (see FIG. 7E).

FIG. 7E shows a cross-sectional view of a completed substrate according to the embodiment of the present invention. The high aperture ratio is materialized by the back exposure due to the fact that the area of the pixel electrode is enlarged, i.e., there is no gap between the data line 110 and the pixel electrode 130.

Referring to FIG. 8, which is an isolated view of a portion "H" of FIG. 7E, the drain electrode 116 and the pixel electrode 130 have side contacts with each other. In the conventional method, the back exposure and a front exposure are used to connect the drain electrode to the pixel electrode. However, according to the embodiment of the present invention, since the side portion of the drain electrode 116 is exposed by the protection layer 112, the pixel electrode 130 can be connected to the drain electrode 116 by being patterned using back exposure without the front exposure. Thus, the additional mask process for the front exposure is not required.

Meanwhile, the pixel electrode 130 overlaps the portion of the drain electrode 116 by a distance of about 2 μm. This is attained by a diffraction effect of the light during the back exposure and by the patterning processes. Thus, the distance of the overlapped portion between the pixel electrode and the drain electrode can be controlled to about 2 μm. In the embodiment of the present invention, the distance of the overlapped portion between the drain electrode 116 and the pixel electrode 130 increases the contact area when compared to the contact area of using only the side portion of the drain electrode 116.

Figure 9:
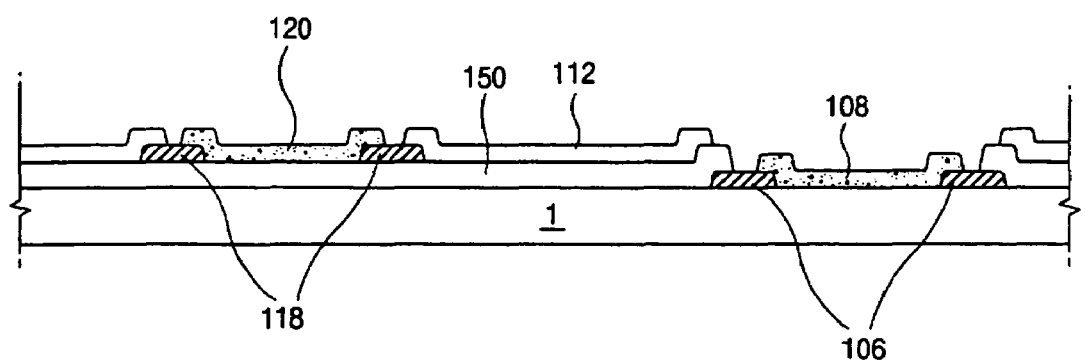
FIG. 9 is a cross-sectional view taken along line IX-IX of FIG. 6 and illustrates a gate pad and a data pad according to the embodiment of the present invention.

FIG. 9 is a cross-sectional view taken along line IX-IX of FIG. 6 and illustrates a gate pad 106 and a data pad 118 according to the present embodiment. When forming the gate pad electrode 108 and the data pad electrode 120, a back exposure similar to that used to form the pixel electrode 130 is adopted. The overlapped portions between the gate pad 106 and gate pade electrode 108, and between the data pad 118 and the data pad electrode 120, can be a distance of about 0.5 μm.

Figure 10:
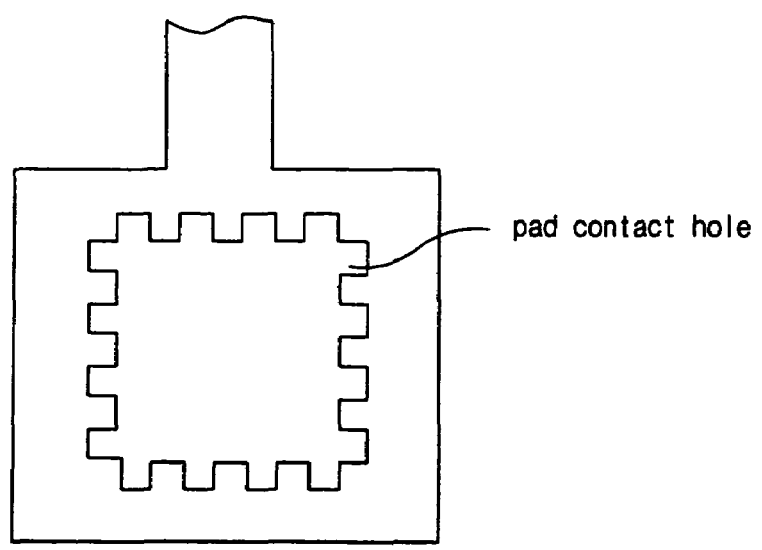
FIG. 10 is a plan view illustrating a gate pad and a data pad according to the principles of the present invention.

FIG. 10 is a plan view illustrating a gate pad 106 or a data pad 118. Gate pad or data pad contact holes are formed before forming the gate pad electrode 108 or the data pad electrodes 120. In this process, the number of the pad contact holes formed in an individual pad can be more than one, and the pad contact holes can have bent shaped peripherals in order to increase the contact area.

As mentioned above, the present invention is fabricated using only four-masks, and a high aperture ratio is achieved by forming the pixel electrode using back exposure. Specifically, a front exposure is not needed to connect the pixel electrode to the drain electrode. Moreover, by forming numerous pad contact holes and bent shape contact holes the contact area between the pad electrodes and the pads can be increased.

Furthermore, the TFT substrate of the illustrated embodiment has the following advantages.

First, since the illustrated embodiment of the present invention employs a four-mask process, the TAT (turn around time) or time of production can be reduced.

Second, due to the four-mask process, the manufacturing yields can increase because mis-alignment can be reduced.

Third, because of the reduced number of process steps, the cost of production can be decreased.

Fourth, because the pixel electrode is formed using only back exposure, a high aperture ratio can be achieved.

While the invention has been particularly shown and described with reference to an illustrated embodiment thereof, it will be understood by those skilled in the art that changes in form and details may be made therein without departing from the spirit and scope of the invention.

What is claimed is:

1. A method of fabricating a thin film transistor substrate, comprising:

forming a gate electrode on a substrate;

forming a gate pad and a data pad, at least one of the gate pad and the data pad having a pad hole therein;

forming a gate insulation layer on the gate electrode and on the substrate;

forming an active layer on the gate insulation layer;

forming source and drain electrodes on the active layer to form a thin film transistor, the source and drain electrodes being spaced apart from each other and located over the gate electrode, wherein the drain electrode has a first side facing the source electrode and a second side facing said first side;

forming a protection layer on the thin film transistor and on the gate insulation layer, wherein forming the protection layer includes etching the protection layer to cover the first side but not the second side of the drain electrode, and wherein the protection layer includes a contact hole exposing the pad hole;

forming a pixel electrode having a plurality of regions wherein a first region is separated from the protection layer at an interval and a second region directly on the gate insulation layer, wherein the second region electrically contacts the second side of the drain electrode, wherein the pixel electrode is formed using a back exposure; and forming a gate pad electrode and a data pad electrode electrically contacting the gate pad and the data pad, respectively, wherein the at least one of the gate pad electrode and the data pad electrode is formed using the back exposure light of which passes through the pad hole, wherein a region where the pad hole is formed is within a region where the contact hole is formed, and wherein the at least one of the gate pad electrode and the data pad electrode is within the region where the contact hole is formed.

2. A method of fabricating a thin film transistor substrate according to claim 1, wherein the pixel electrode is formed overlapping the second side.

3. A method of fabricating a thin film transistor substrate according to claim 1, wherein the pixel electrode is formed of a transparent conductive material.

4. A method of fabricating a thin film transistor substrate according to claim 3, wherein the transparent conductive material is selected from a group consisting of indium-tin-oxide (ITO) and indium-zinc-oxide (IZO).

5. A method of fabricating a thin film transistor substrate according to claim 1, further including:

forming a gate line on the substrate, wherein the gate line includes the gate pad, and wherein the gate line is formed in electrical contact with the gate electrode;

covering the gate pad with the gate insulation layer and the protection layer;

forming the contact hole through the gate insulation layer and through the protection layer to expose at least part of the gate pad; and forming the gate pad electrode that electrically contacts the gate pad through the contact hole.

6. A method of fabricating a thin film transistor substrate according to claim 5, wherein the pad hole of the gate pad is formed with a substantially bent shape.

7. A method of fabricating a thin film transistor substrate according to claim 5, wherein the gate pad electrode is formed on the substrate.

8. A method of fabricating a thin film transistor substrate according to claim 1, further including:

forming a data line on the gate insulation layer, wherein the data line includes the data pad, and wherein the data line is formed in electrical contact with the source electrode;

covering the data pad with the protection layer;

forming the contact hole through the protection layer to expose at least part of the data pad; and forming the data pad electrode that electrically contacts the data pad through the contact hole.

9. A method of fabricating a thin film transistor substrate according to claim 8, wherein the pad hole of the data pad is formed with a substantially bent shape.

10. A method of fabricating a thin film transistor substrate according to claim 8, wherein the data pad electrode is formed on the gate insulation layer.

* * * * *